United States Patent Office 2,699,832
Patented Jan. 18, 1955

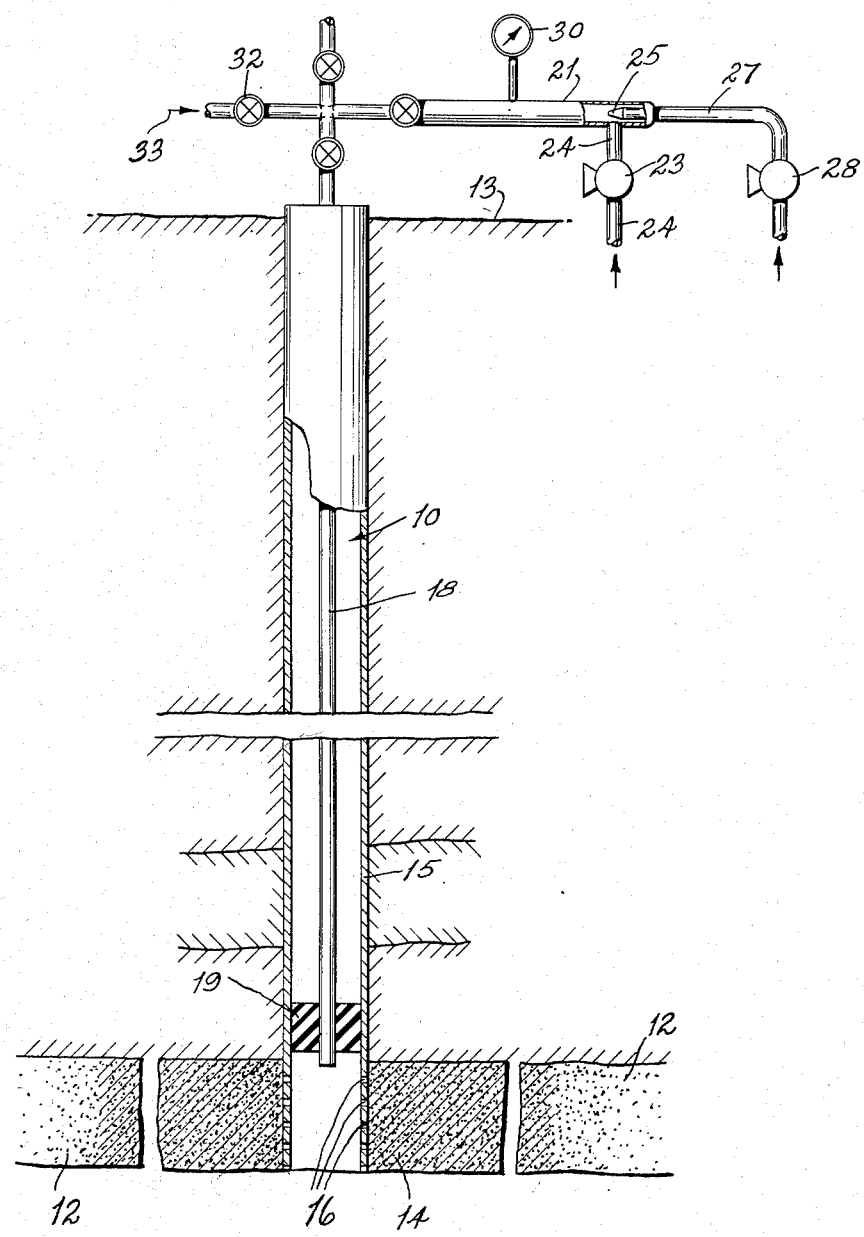

2,699,832

INCREASING THE PRODUCTION OF OIL FROM SUBSURFACE FORMATIONS

Joseph C. Allen, Houston, Tex., assignor to The Texas Company, New York, N. Y., a corporation of Delaware Application December 9, 1950, Serial No. 199,942

10 Claims. (Cl. 166—42)

The present invention relates to the recovery of hydrocarbons from a porous subsurface formation containing oil, by means of a producing well extending into the formation.

The present invention has particular application to the production of oil from porous, liquid oil bearing formations which have become clogged or restricted to a material extent by relatively immobile solid or semi-solid hydrocarbons. In many subsurface reservoirs containing liquid petroleum there is a tendency toward the precipitation of small amounts of waxy, bituminous, asphalt like materials in the interstices of the porous passages about the well bore which tend to obstruct the passageways, so that the permeability of the formation decreases. Ultimately, therefore, the rate of oil flow is decreased and may cease entirely. The formation of this precipitate may be due to a streaming potential, to the liberation of solution gas or some other mechanism, but in any event, tends to seriously decrease the rate of production.

In accordance with the present invention, the region about a producing well bore in a formation, as above, the permeability of which has been impaired by precipitated, relatively immobile hydrocarbons, is treated with a fluid comprising a normally liquid solvent for the heavy hydrocarbons and a normally gaseous hydrocarbon. More specifically, the fluid is a single phase admixture which exhibits retrograde behavior. Under the conditions of temperature and pressure prevailing in the formation, this single phase admixture constitutes a homogeneous fluid solvent-gas mixture, which is subject to retrograde condensation upon isothermal pressure decrease.

Such a fluid mixture exhibiting retrograde phenomena is in effect a gas enriched with solvent vapor substantially in excess of the amount of vapor which the gas could carry in the absence of retrograde vaporization. In this mixture the highly compressed gas actually dissolves a substantial amount of the solvent liquid while still retaining the desirable characteristics of the gas. This mixture, for the purpose of the present specification and claims, is referred to as retrograde-enriched gas.

Retrograde behavior as referred to herein is the phenomenon whereby at high pressures and at temperatures above the temperature of the critical point (the pressure and temperature at which the liquid and gas phases have the same composition), a normally liquid material is caused to vaporize in a normally gaseous material by an increase in pressure, thereby forming a single phase resembling a gas and defined herein as retrograde-enriched gas. Conversely, when the retrograde-enriched gas is subjected to isothermal pressure reduction, condensation of the normally liquid material occurs, resulting in the production of a two phase product. The vaporization which occurs due to pressure increase and the condensation occurring as the result of pressure decrease are respectively referred to as retrograde vaporization and retrograde condensation to signify an effect opposite to the accustomed phenomenon by which condensation occurs ordinarily with an increase in pressure and vaporization with a decrease in pressure. For a concise description of retrograde behavior, reference is made to the following:

Paper by D. L. Katz and F. Kurata entitled "Retrograde Condensation," Ind. Eng. Chem., vol. 32, No. 6, pages 817–829

Article by J E. Cherburne entitled "Fundamental Phase Behavior in Hydrocarbons," AIME Tech. Pub. 1152

"Volumetric and Phase Behavior of Hydrocarbons" by Sage and Lacey, Stanford University Press The following issued patents also contain concise references to retrograde behavior:

D. L. Katz et al., No. 2,391,576, issued December 25, 1945
H. S. Cole, Jr., et al., No 2,361,012, issued October 24, 1944

The retrograde-enriched gas is forced radially from the well bore to saturate a predetermined section of the formation about the well bore in contact with the interior surfaces of the porous formation, containing the precipitated immobile solids The retrograde-enriched gas, in contact with the formation, proceeds to liquefy or melt the precipitated solids. Therefore, it is permitted to remain in contact with the formation for a time sufficient to complete the solution or liquefaction of the flow impairing precipitate, and form therewith a relatively mobile, low viscosity liquid. Thereafter, the resulting immobile, low-viscosity liquid containing the dissolved precipitates is withdrawn into the well bore and production resumed under conditions of substantially increased permeability of the formation to liquid hydrocarbons.

The ability of the retrograde-enriched gas to flush or purge the interstices of the porous formation as above intimated, is due to the high solvent capacity of the retrograde-enriched gas and also to its high affinity for the precipitated solids which retard oil flow. Actually, contact of the retrograde-enriched-gas with the relatively immobile, heavy hydrocarbon, radically changes the phase behavior of the system resulting in what is, in effect, a selective absorption by the solid material of solvent from the retrograde-enriched gas. For purposes of visualizing the resulting effect, it may be considered as analogous to "salting out" or condensation of solvent from the essentially gasiform mixture wherever it comes into contact with the solids which clog the formation. Stated in terms of the actual result realized, the retrograde-enriched gas upon contact with the relatively immobile, heavy hydrocarbon exhibits a decreased solvent capacity for the contained normally liquid solvent. Therefore, the liquid solvent precipitates out or condenses as a liquid upon the surfaces of the immobile hydrocarbon and liquefies it.

In any event, the solid materials tending to clog the formation are transformed into a fluid solution which readily flushes out of the formation when production is resumed.

Flushing or cleansing the porous interstices of such a formation with a liquid solvent introduced as a liquid has the disadvantage of the relatively high viscosity of the liquid as compared to that of a gas. In other words, liquid solvent meets substantial flow resistance through the restricted interstices making it difficult to completely permeate the formation. Therefore, the liquid solvent tends to channel through the more open and permeable stringers or passages of the formation and thus avoid the more restricted pores which are usually the most severely clogged.

In accordance with the present invention, however, the retrograde-enriched gas carries large amounts of solvent in solution without materially altering its essential characteristics as a gas. Therefore, quantities of solvent, ample to dissolve the immobile deposits, are brought into the formation with the relative ease of gas flow as contrasted with liquid flow and readily permeate the minutest passages of the formation. Therein the solvent reaches the remote restricted regions and proceeds to liquefy the relatively immobile hydrocarbon material as above shown. Manifestly, in the usual oil bearing formation, the tortuosity of the course that a fluid must travel in order to contact all of the pore space in which solids may be accumulated is extreme. Thus, the extent of permeation of the formation by a gas is materially greater than by a liquid, other conditions being the same.

The presence of some liquid phase solvent with the retrograde-enriched gas is not disadvantageous in all cases for the reason that the liquid phase tends to enter the larger and more open pores, and, in effect, channels the gasiform retrograde-enriched gas into the more minute interstices of the formation, Furthermore, small amounts of liquid phase solvent do not necessarily effect material de-enrichment of the retrograde-enriched gas phase. In addition, it has been discovered that, in the presence of the retrograde-enriched gas, the viscosity of the liquid phase solvent is sharply lowered by the dissolved solution gas.

Treatment of a formation with a retrograde-enriched gas for purging solid agglomerates offers an additional advantage over the use of a solvent in the liquid state. After the treating phase has permeated the remote, restricted regions as above and contact maintained to effect liquefaction of the solids, the well is produced which causes the pressure on the treated area to drop. This pressure drop results in iso-thermal retrograde condensation of at least some of the solvent from the retrograde-enriched gas. Over the entire treated area the fluids move toward the well bore. The condensed solvent returns to the well bore and provides a second or additional dissolving-washing action upon any solids or semi-solid immobile materials. In other words, the retrograde-enriched gas provides a medium for carrying substantial quantities of solvent into the tortuous interstices which, upon resumption of flow to the well bore, tends to condense excess solvent and provide, in addition to the gaseous solvent, a liquid solvent for additionally flushing the formation.

The normally gaseous constituent of the retrograde-enriched gas is preferably, as above indicated, a hydrocarbon having a critical temperature lower than reservoir temperature, that is, a gas which under the subsurface conditions encountered in the formation will not liquefy, per se. For subsurface temperatures above about 100° F., therefore, methane, ethane, and ethylene are typical examples. Of the related hydrocarbons propane may be used when the subsurface temperatures encountered are above 206° F.

Broadly, however, the normally gaseous constituent is not limited to hydrocarbon gases, but may include any normal gas having a critical temperature below the formation temperature and capable of forming a retrograde-solvent enriched gas with the liquid solvent; that is to say, a gas capable of being substantially enriched with the liquid solvent, by means of retrograde vaporization, while retaining the essential characteristics of a gas.

The solvent component of the retrograde-enriched mixture comprises any normally liquid solvent which will dissolve immobile, heavy hydrocarbons and which will vaporize in the normally gaseous constituent or carrier gas at the elevated temperature and pressure of the formation in accordance with the phenomenon of retrograde vaporization. Preferred examples of the liquid solvent are benzene and carbon tetrachloride. Others are pentane, hexane, pyridine, carbon bisulfide, and the like.

The relative proportions of the normally gaseous and the solvent-liquid constituents employed in the treatment of the formation are those which form a retrograde-enriched gas phase of substantial liquid solvent concentration at the pressure and temperature of the formation, preferably a solvent content approximating the maximum attainable under such conditions.

For example, at a formation pressure of 3730 p. s. i. a. and formation temperature of 200° F., methane and carbon tetrachloride form a retrograde-enriched gas phase containing 27 mol per cent of CCl$_4$. This contrasts with a concentration of only about one mol per cent which would be anticipated in absence of retrograde behavior. At a pressure of 3610 p. s. i. a. and a temperature of 180° F. a retrograde gas phase will form having a concentration of 13 mol per cent CCl$_4$. These represent the approximate optimum ratios of injection into the respective formations.

It is apparent, however, that in each case the preferred ratio of gas-solvent injection depends upon the characteristic pressure-temperature phase behavior diagram (the phase representation on pressure and temperature coordinates) of the gas and solvent employed. This relationship is a fixed and known or readily determinable factor which, per se, forms no part of the present invention and varies with the gas and solvent selected. However, from the phase diagram can be selected the approximate relative quantities of gas and solvent corresponding to the retrograde-enriched gas indicated by the pressure-temperature phase behavior diagram at the conditions of temperature and pressure prevailing in the formation to be treated.

In general it is advantageous to select a gas-solvent mixture which, under the conditions of temperature and pressure prevailing in the formation to be created, forms a retrograde-enriched gas containing at least 10 and preferably above about 25 mol per cent solvent.

In accordance with one specific example, set forth to illustrate the invention in greater detail, a well bore 10, represented more or less diagrammatically in the accompanying drawing, extends downwardly into a subsurface producing formation 12 a distance or depth of about 8,000 feet below the surface of the ground 13. The subsurface formation 12 is a typical oil bearing reservoir for purposes of illustration assumed to be ten feet thick, and having a formation pressure of approximately 4,000 p. s. i. a. and a temperature of about 230° F. The total porosity of the producing formation as determined by core samples is about 20 per cent and interstitial or connate water occupies about 40 per cent of the porous space in the formation. The pore space occupied by the hydrocarbons amounts to about 12 per cent of the producing formation. The shaded area 14 of the formation about the well bore illustrates diagrammatically the region in which permeability is impaired by the precipitation of relatively immobile hydrocarbons on the walls of the pores. Ordinarily the impairment is greatest near the well bore and decreases radially outwardly therefrom.

As a result of this impairment, the productivity index of this well is substantially zero as against an original productivity index of approximately 8.

The well casing represented by the reference numeral 15 extends downwardly into the formation 12 where it is perforated as at 16. The production tubing 18 extends centrally of the casing terminating just below production packer 19.

At the well head the production tube 18 is fitted with a "Christmas tree" from which extends a branch pipe 21 connecting through a pressure pump 23 and branch pipe 24 with a source of high pressure natural gas not shown. The natural gas consists essentially of methane. Injection nozzle 25 at the junction of branch pipes 21 and 24 is fed through with pipe 27 and a second pressure pump 28 from any convenient source of carbon tetrachloride, not disclosed.

Pumps 24 and 28 are started at carefully proportioned rates to inject gas and solvent into production tube 18. The rate of solvent injection is equal to about 400 barrels of carbon tetrachloride per million cubic feet of natural gas. As injection proceeds, the well head pressure, as indicated by gauge 30 rises to about 3,000 p. s. i. a. at a gas temperature of 90° F. After approximately one million cubic feet of gas and about 400 barrels of the solvent have been forced into the formation, injection is stopped and the well is sealed.

At this time, the formation is saturated for a distance of about 41 radial feet back from the well bore with the gaseous mixture.

Under the formation pressure and temperature the injected mixture necessarily exists as a retrograde-enriched gas having the characteristic low viscosity of a gas but containing somewhat over 25 per cent CCl$_4$ in solution in the gas. Therefore at the high pressures involved, there is obviously a large concentration of solvent in contact with the interior of the formation.

Upon contact with the solid hydrocarbon deposits, the phase conditions change causing the "salting out" or precipitation of liquid on the relatively immobile hydrocarbons which immediately commence to dissolve or liquefy. After a period of about twenty-four hours to permit the completion of the solvent process, pressure is released through the valve 32 in side arm 33 and production resumed. First the residual gas treating phase carrying with it the liquefied deposits is flushed from the formation. Thereafter flow of formation oil takes place through pipe 18 at a production index of about 7.

From the foregoing it is apparent that the well has been restored to a high degree of productivity. Usually the restoration of productivity lasts for a substantial period of time, but the restored rate may tend to decline gradually as before. Therefore, at periodic intervals of, say one month, the treatment is repeated, in each case restoring the production to about the level indicated.

The interval of retreatment may be varied widely depending on the desired rate of production and the cost of treatment. Usually treatment is repeated at intervals sufficient to result in average allowable production rate.

In place of CCl$_4$ in the above example approximately the same proportion of benzene or hexane may be employed. Likewise, ethane or propane may be substituted for natural gas as the fixed gas constituent.

It is important to note that the normally gaseous hydrocarbon may be a mixture of such gases. In fact, as a general rule a retrograde-enriched gas phase containing mixtures of normally gaseous hydrocarbons may hold substantially larger quantities of solvent than a retrograde-enriched gas phase based upon pure methane alone. In general, therefore, the presence of some $C_2$–$C_4$ gases in the mixture is advantageous.

Likewise mixtures of solvents may be employed and, in fact, such mixtures are preferred for the reason that thereby a higher degree of solvent concentration in the retrograde-enriched gas likewise follows.

In general, the presence of any hydrocarbon, intermediate, as regards molecular weight, between the lightest normally gaseous hydrocarbon and the heaviest solvent of the retrograde-enriched gas phase, tends to lower the retrograde dew point pressure and therefore increase the quantity of solvent which may be carried in the retrograde gas phase. For example, the presence of butane in a methane-decane mixture drastically reduces retrograde dew point pressure. The treatment phase may therefore comprise a mixture of methane, propane, pentane, and benzene, or a mixture of methane, butane, hexane, and carbon tetrachloride.

Where formation pressure is below the region of retrograde behavior, the necessary pressure to effect the creation of the retrograde-enriched gas phase may be attained by injection at rates sufficient to build pressures substantially above formation pressure. More specifically, the treatment mixture is forced to the well at a rate greater than the flow capacity of the formation. As a result, the pressure will rise to region of retrograde behavior at which a true retrograde-enriched gas phase forms. Therefore, it will be seen that the invention is applicable also to relatively shallow wells of low formation pressure below 1,000 p. s. i. a.

Obviously many modifications and variations of the invention, as hereinbefore set forth, may be made without departing from the spirit and scope thereof, and, therefore, only such limitations should be imposed as are indicated in the appended claims.

I claim:

1. In the production of oil from a subsurface oil bearing formation by means of a well bore extending into said formation, the production from which is substantially reduced by an accumulation of substantially immobile hydrocarbons within the internal pores of the formation, injecting into the formation through the well bore a retrograde-enriched gas comprising a normally gaseous hydrocarbon carrying in single phase admixture therewith a substantial proportion of a normally liquid solvent for heavy hydrocarbons, and subject to retrograde condensation upon iso-thermal pressure decrease, thereby saturating a predetermined area of the formation about the well bore with said retrograde-enriched gas, permitting the retrograde gas phase to remain in contact with the formation for a period of time sufficient to liquefy said relatively immobile hydrocarbons, reducing the pressure on said injected gas within said formation whereby the liquefied immobile hydrocarbons are flushed from the formation into the well bore, and then resuming production flow of the well at a restored rate of substantially higher production.

2. The method according to claim 1 wherein the retrograde-enriched gas contains at least about 10 mol per cent of solvent.

3. The method according to claim 1 wherein the retrograde-enriched gas contains at least about 25 mol per cent of solvent.

4. The method according to claim 1 wherein the retrograde-enriched gas contains a mixture of normally gaseous hydrocarbons.

5. The method according to claim 1 wherein the retrograde-enriched gas contains a mixture of solvents.

6. The method according to claim 1 wherein the said treatment is repeated at periodic intervals.

7. The method according to claim 1 wherein the retrograde-enriched gas contains a substantial proportion of a hydrocarbon intermediate, as regards molecular weight between the normally gaseous hydrocarbon and the said solvent.

8. The method according to claim 7 wherein said intermediate molecular weight hydrocarbon is butane.

9. In the production of oil by means of a producing well bore extending into a subsurface, high pressure oil bearing formation, the interstices of which formation are at least partly clogged by an accumulation of substantially immobile hydrocarbons which materially reduce production, the steps comprising injecting into the formation through the well bore a normally gaseous hydrocarbon and a normally liquid solvent for heavy hydrocarbons in relative proportions selected such that the resulting mixture will exist as a retrograde-enriched gas comprising a single homogeneous phase under the temperature and pressure existing in the aforesaid high pressure subsurface formation, said retrograde-enriched gas being subject to retrograde condensation upon isothermal pressure decrease, maintaining said retrograde-enriched gas in contact with the formation for a substantial period of time sufficient to liquefy said relatively immobile hydrocarbons, thereafter withdrawing said liquefied hydrocarbons into the well bore and resuming production flow of the well at a restored rate of production.

10. The method according to claim 1 wherein simultaneously with the treatment of the formation by said retrograde-enriched gas, there is injected into said formation an additional quantity of said solvent in excess of the amount which can be carried by the retrograde-enriched gas whereby the formation under treatment contains, in addition to the retrograde-enriched gas, liquid solvent containing dissolved solution gas.

References Cited in the file of this patent

UNITED STATES PATENTS

| | | |
|---|---|---|
| 2,135,319 | Bays | Nov. 1, 1938 |
| 2,265,923 | Normand | Dec. 9, 1941 |
| 2,361,012 | Cole et al. | Oct. 24, 1944 |
| 2,370,507 | Teichmann et al. | Feb. 27, 1945 |